(No Model.)
T. P. WHITTIER.
GALVANIC BATTERY EXCITANT.
No. 383,263. Patented May 22, 1888.
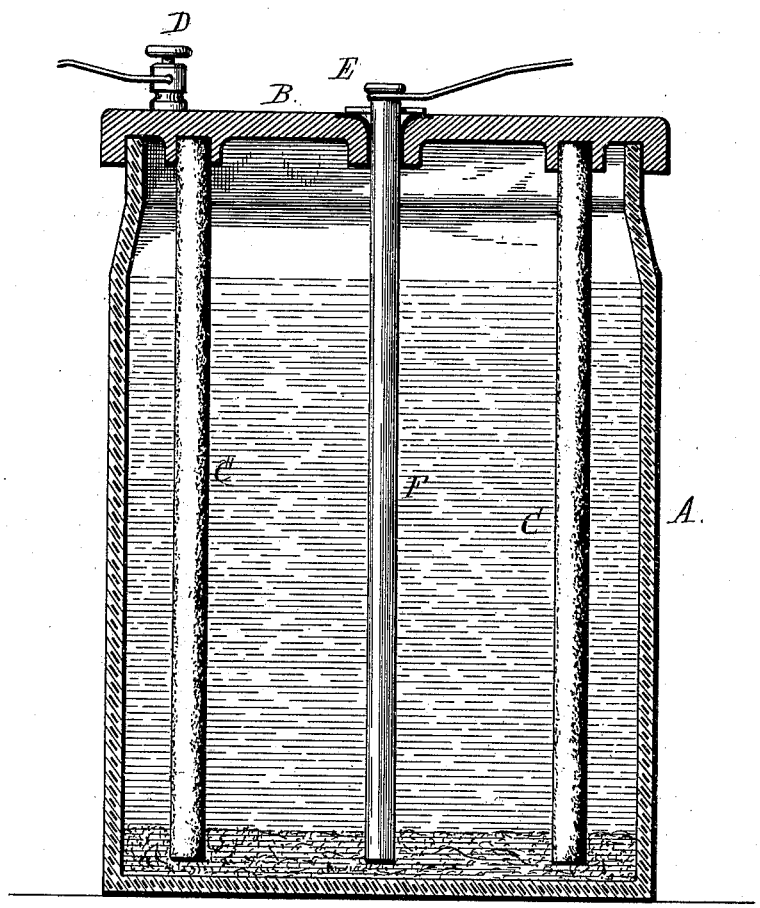

United States Patent Office.

THOMAS P. WHITTIER, OF EAST SAGINAW, MICHIGAN.

GALVANIC-BATTERY EXCITANT.

SPECIFICATION forming part of Letters Patent No. 383,263, dated May 22, 1888.

Application filed February 11, 1888. Serial No. 263,698. (No specimens.)

*To all whom it may concern:*

Be it known that I, THOMAS P. WHITTIER, a citizen of the United States, residing at East Saginaw, county of Saginaw, and State of Michigan, have invented certain new and useful Improvements in Galvanic Batteries, of which the following is a specification.

My invention relates to that class of galvanic batteries ordinarily known as "single-fluid batteries." Its object is to obtain a battery of this kind which shall be more constant in action, and which shall retain its efficiency for a longer period than others which heretofore have been commonly used. This result I obtain by the use as an excitant of a complex salt containing, essentially, and as its main constituents the chlorides and bromides of sodium, calcium, and magnesium obtained from the waste product or residual of natural salt-bearing brine which remains after the ordinary marketable table and cattle salts have been extracted. The excitant referred to can be obtained from this residual product by ordinary or suitable processes of evaporation, and in addition to the ingredients above named it usually contains also a small percentage of sodium sulphate, as well as traces of iodine, iron, and potassium. This excitant I preferably use in connection with carbon and zinc as electrodes; but I am by no means confined to the use of these materials, since very good results are obtained with other materials, and more especially with iron as the positive electrode; nor am I confined to any particular form of battery, and that shown in the accompanying drawing is only one of the numerous forms which I may use. The battery-cell shown is composed of a jar, A, of insulating material, having a cover, B, of metal, carrying a number of carbon rods, C, in electrical contact therewith, and a binding-post, D, which constitutes the terminal of the negative electrode— *i. e.*, the positive pole of the battery. In the center of the cover there is an opening, E, lined with insulating material, through which the positive electrode F is inserted. All this may be of any ordinary or improved construction and is only here shown as one specimen of a known type of battery in connection with which my excitant can be used to advantage.

As stated above, my improvement consists in the use as an excitant of a complex salt, which I derive from the residual of natural salt-bearing brine which is left after the marketable table and cattle salts have been extracted therefrom. The proportions of the constituents of the excitant vary within wide limits, but on the average they may be generally stated as follows: Sodium chloride, seventy-two per cent.; calcium chloride, fourteen per cent.; magnesium chloride, three per cent.; sodium bromide, one per cent.; water of crystallization, ten per cent., and a small quantity (about one-third of one per cent.) of sodium sulphate, and traces of iron, iodine, and potassium.

The battery-jar is filled with a saturated solution of this excitant, and by preference the jar is charged with more of the salt than will be dissolved, as is the usual practice in batteries of this character, although a saturated and filtered solution may be used with great advantage. When the battery-circuit is closed, the chloride and bromide act upon the zinc, forming chloride and bromide of zinc and hydrates of sodium, calcium, and magnesium, and these last-named alkaline hydrates in turn act upon the chloride and bromide of zinc, (especially when the circuit is opened,) reforming in part the original chlorides and bromides and precipitating insoluble zinc basic chloride and hydrate. It is to these reactions mainly that I attribute the superior constancy which the battery in practice exhibits, as well as its power of rapid recuperation when the circuit is opened, if after long-continued action the liquid has become unduly charged with zinc salts.

That the foregoing is the true action of the battery when my excitant is used is rendered very probable by the fact that if to a portion of the liquid taken from the battery after the latter has been in action for some time a small quantity of alkaline hydrate be added a precipitate will be obtained of the same composition as that which is deposited in the cell after prolonged action; but whatever may be the true explanation, the fact remains that the battery is rendered very constant and has marked power of recuperation.

I may also say here that I have found that although bromides and chlorides are perhaps of about equal value when used singly, yet the bromides act more quickly than the chlorides, while on the other hand the chlorides render the battery more constant than the bromides. A mixture of the two such as I obtain, therefore, is better than either one singly in that it combines the rapid action of the bromide with the constancy of the chloride.

Having described my invention, what I claim, and desire to secure by Letters Patent, is—

An excitant for galvanic batteries, composed, essentially, of a solution of the residual salts from natural brine, substantially as described.

In testimony whereof I have signed my name to this specification in the presence of two subscribing witnesses.

THOS. P. WHITTIER.

Witnesses:
JOSEPH LYONS,
FANNIE WISE.